(12) United States Patent
Fujimoto et al.

(10) Patent No.: US 8,089,851 B2
(45) Date of Patent: Jan. 3, 2012

(54) DRIVING APPARATUS AND RECORDING/REPRODUCING APPARATUS

(75) Inventors: Kenjiro Fujimoto, Saitama (JP); Shuntaro Mori, Saitama (JP); Masahiro Ishimori, Saitama (JP); Takanori Maeda, Saitama (JP)

(73) Assignee: Pioneer Corporation, Tokyo (JP)

( * ) Notice: Subject to any disclaimer, the term of this patent is extended or adjusted under 35 U.S.C. 154(b) by 330 days.

(21) Appl. No.: 12/439,038

(22) PCT Filed: Sep. 1, 2006

(86) PCT No.: PCT/JP2006/317364
§ 371 (c)(1),
(2), (4) Date: Apr. 16, 2009

(87) PCT Pub. No.: WO2008/026293
PCT Pub. Date: Mar. 6, 2008

(65) Prior Publication Data
US 2009/0321188 A1 Dec. 31, 2009

(51) Int. Cl.
*G11B 7/00* (2006.01)
(52) U.S. Cl. .................................. 369/127; 369/140
(58) Field of Classification Search .............. 369/126, 369/127, 140
See application file for complete search history.

(56) References Cited

U.S. PATENT DOCUMENTS

| 4,200,341 A | 4/1980 | Kauschke |
| 4,272,216 A | 6/1981 | Osburn |
| 6,084,849 A * | 7/2000 | Durig et al. ............. 369/126 |
| 2007/0121477 A1* | 5/2007 | Belov et al. ............. 369/126 |
| 2007/0253314 A1* | 11/2007 | Jones et al. ............. 369/126 |

FOREIGN PATENT DOCUMENTS

| DE | 32 02 188 A1 | 8/1993 |
| FR | 2 377 553 A | 8/1978 |
| JP | 5-52509 | 3/1993 |
| JP | 7-60581 | 3/1995 |
| JP | 10-40597 | 2/1998 |

OTHER PUBLICATIONS

International Search Report for PCT/JP2006/317364, mailed Dec. 26, 2006.

* cited by examiner

*Primary Examiner* — Adam R Giesy
(74) *Attorney, Agent, or Firm* — Nixon & Vanderhye P.C.

(57) ABSTRACT

A driving apparatus (1) is provided with: a fixed part (11) having a fixed-part plane (12); and a driven part (13) having a driven-part plane (14), which faces the fixed-part plane, and driven in a direction substantially parallel to the fixed-part plane, a liquid lubricant (30) is between the fixed-portion plane and the driven-part plane, the driven-part plane faces the fixed-part plane such that the driven-part plane is substantially parallel to the fixed-part plane.

9 Claims, 14 Drawing Sheets

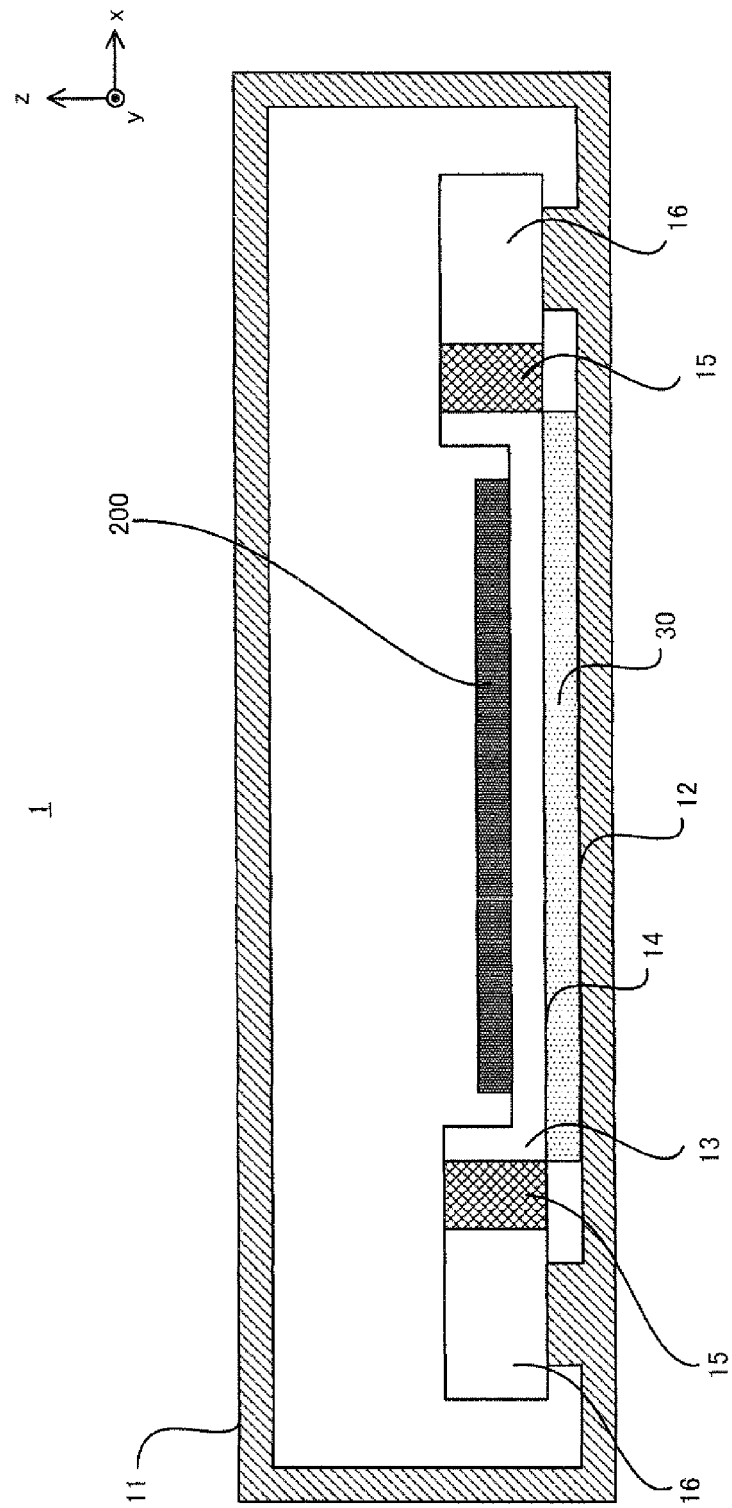
[FIG. 1]

[FIG. 2]
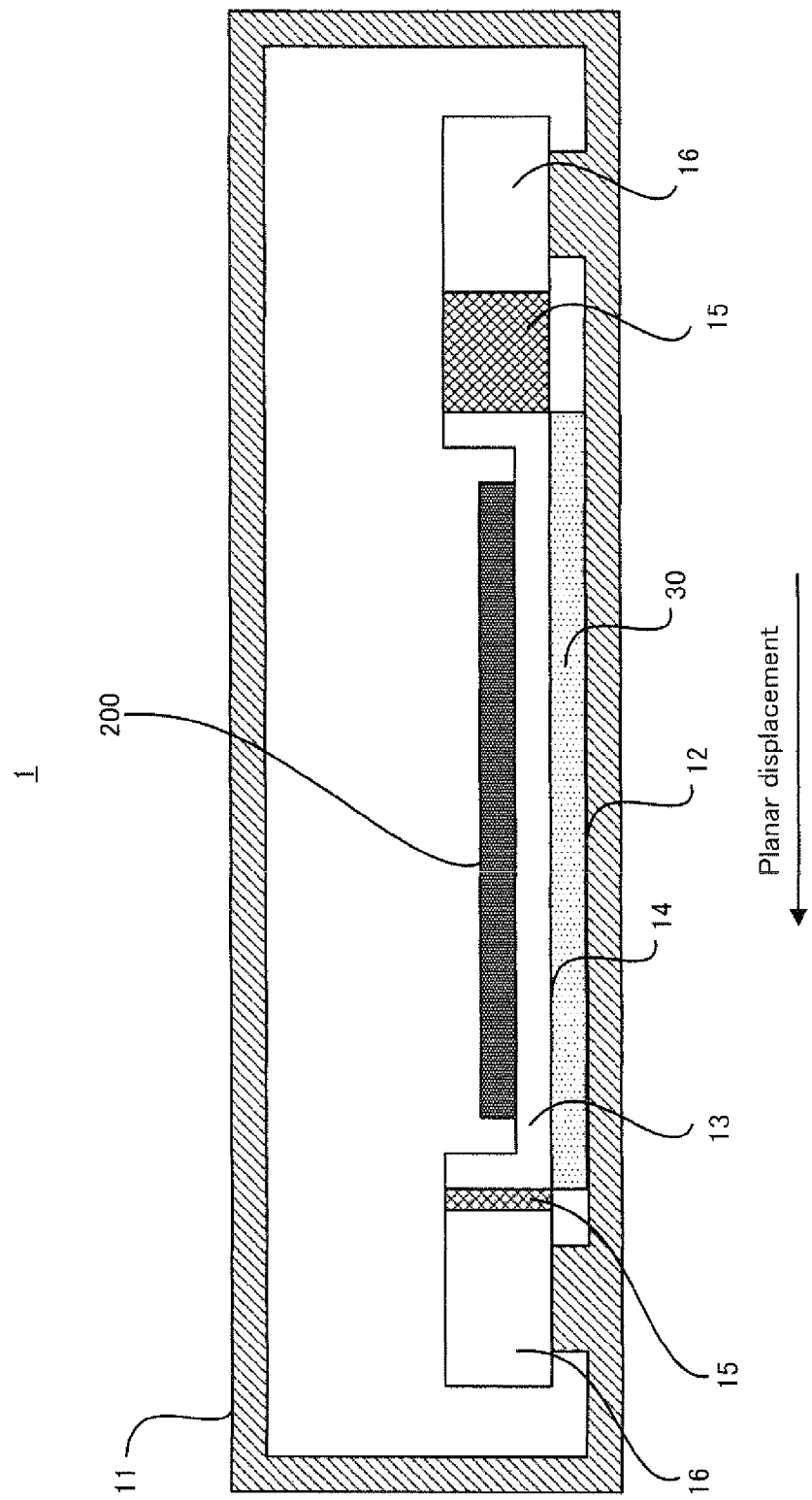

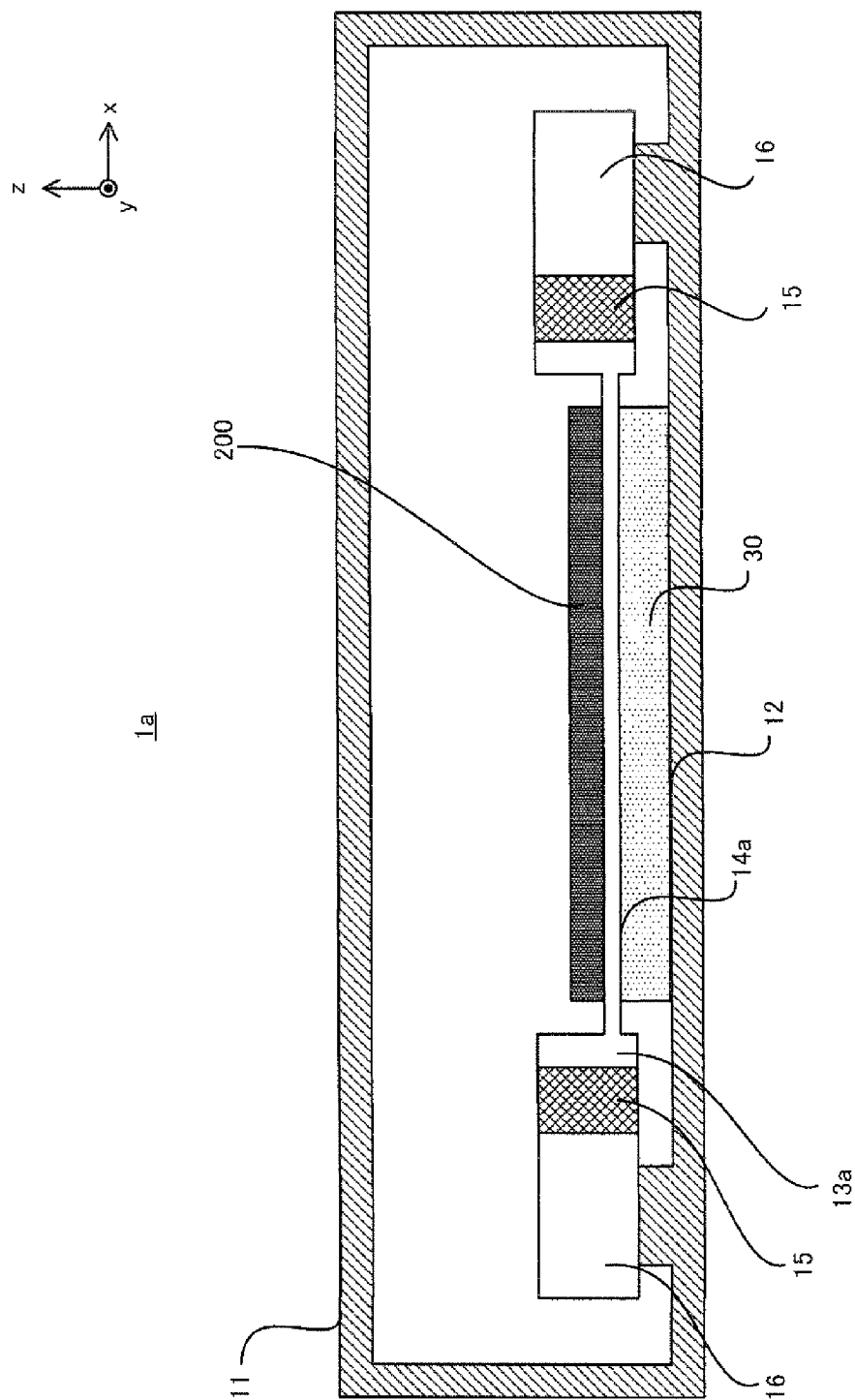
[FIG. 3]

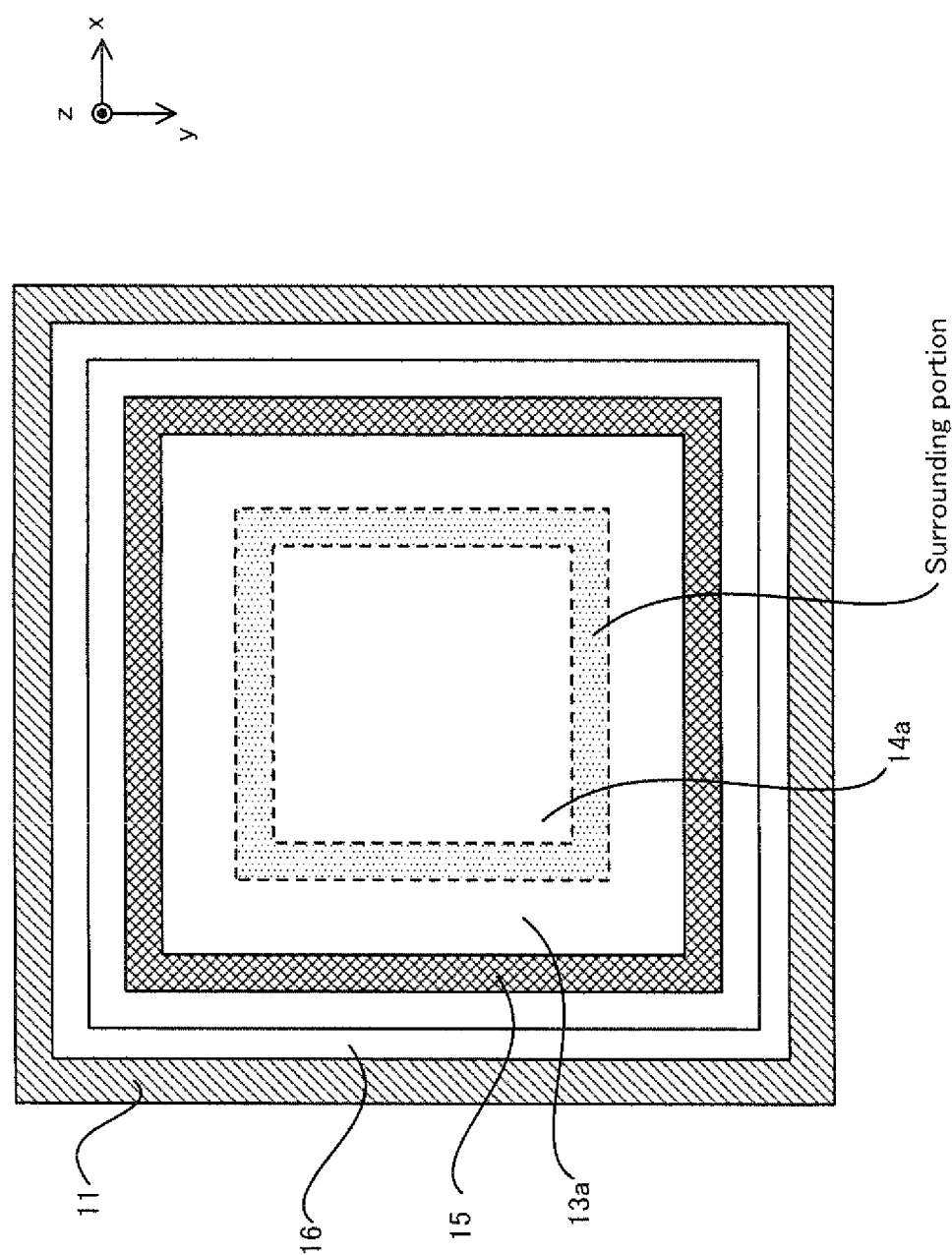

[FIG. 5]
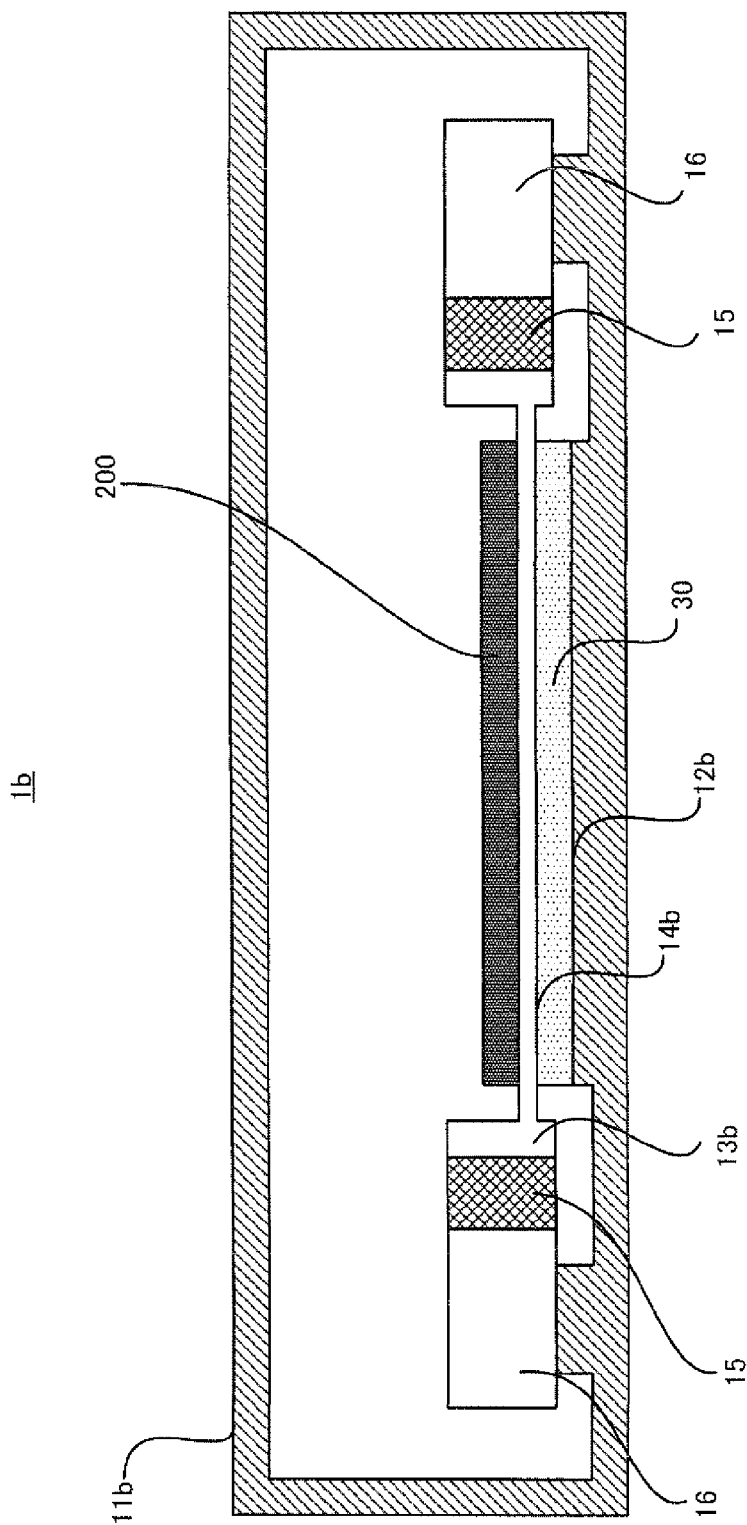

[FIG. 6]
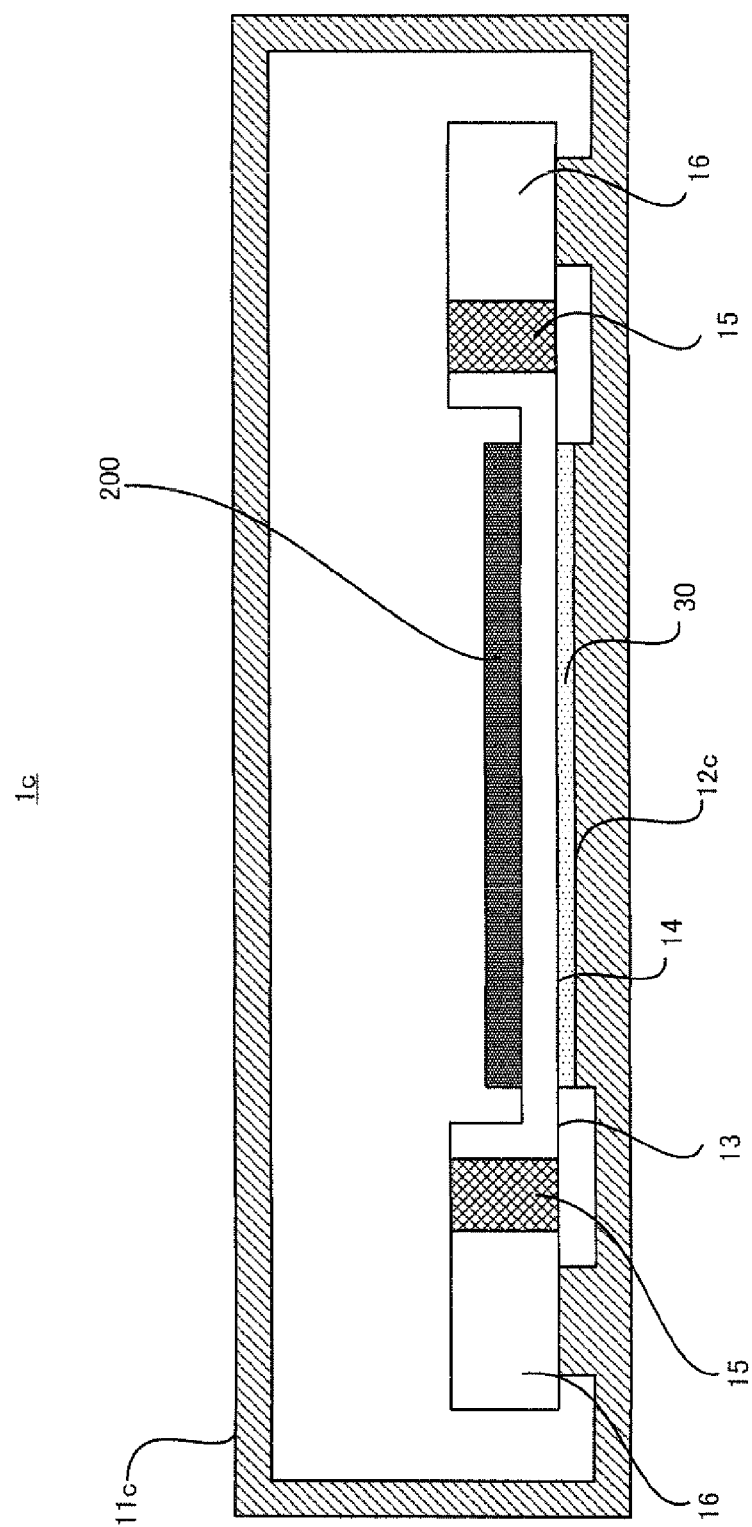

[FIG. 7]
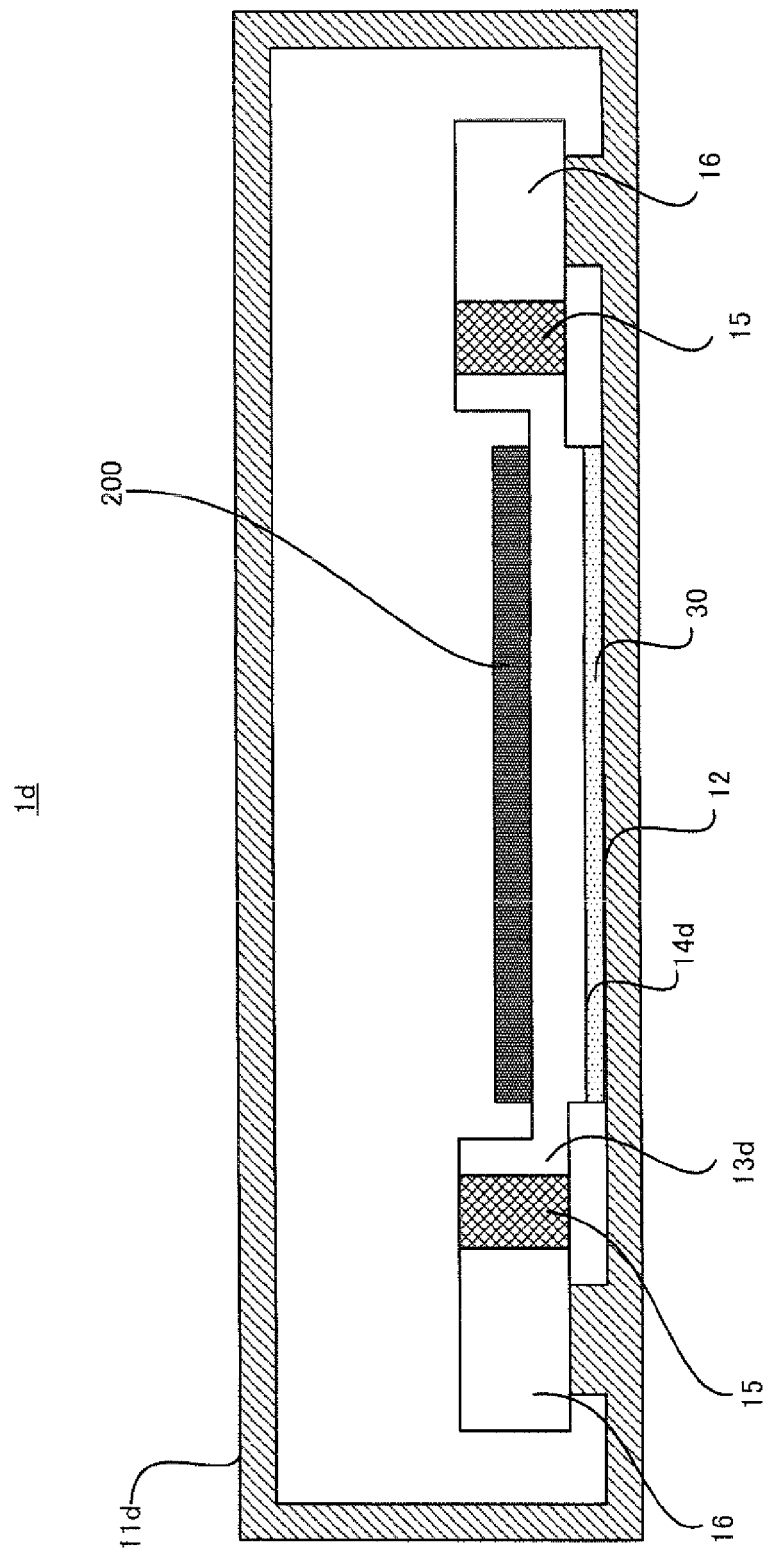

[FIG. 8]
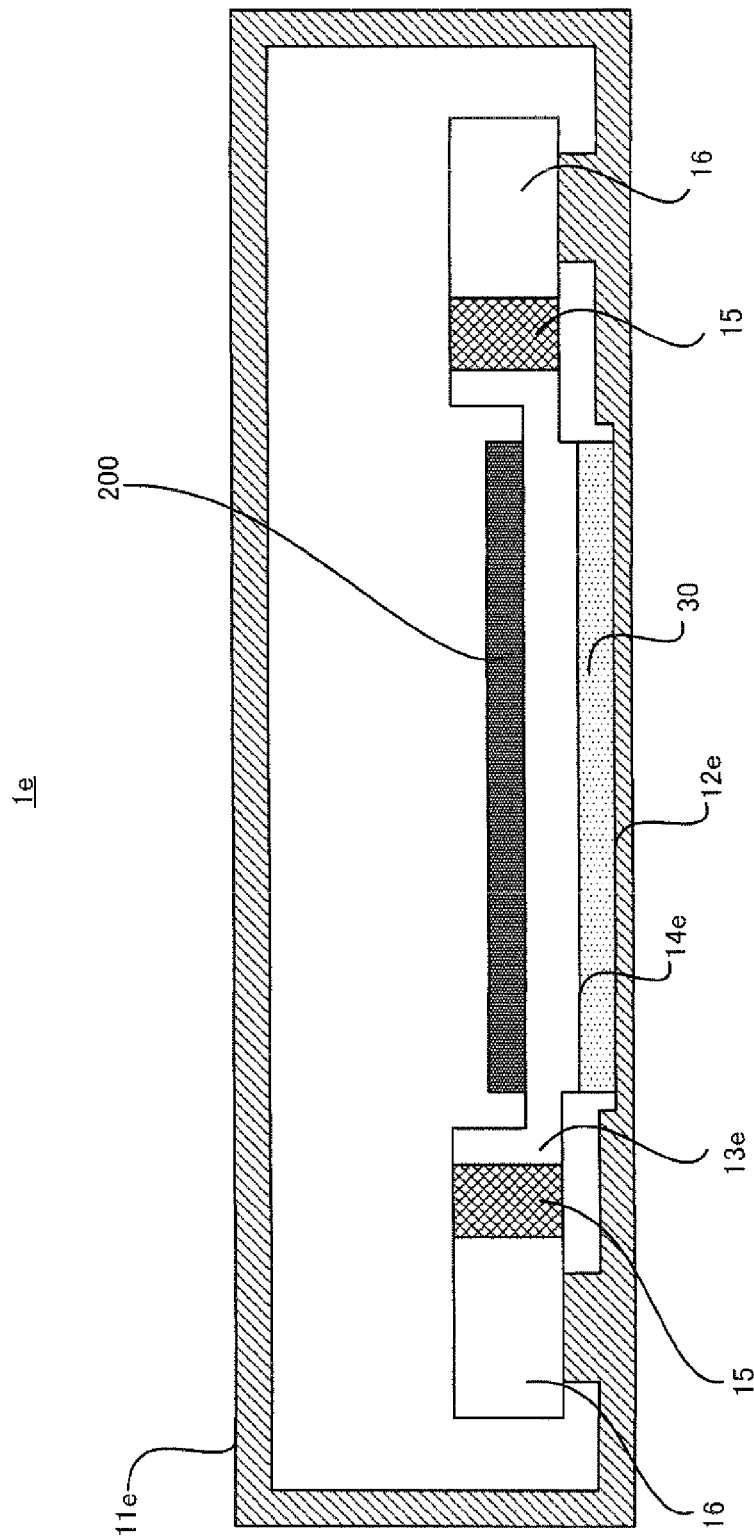

[FIG. 9]
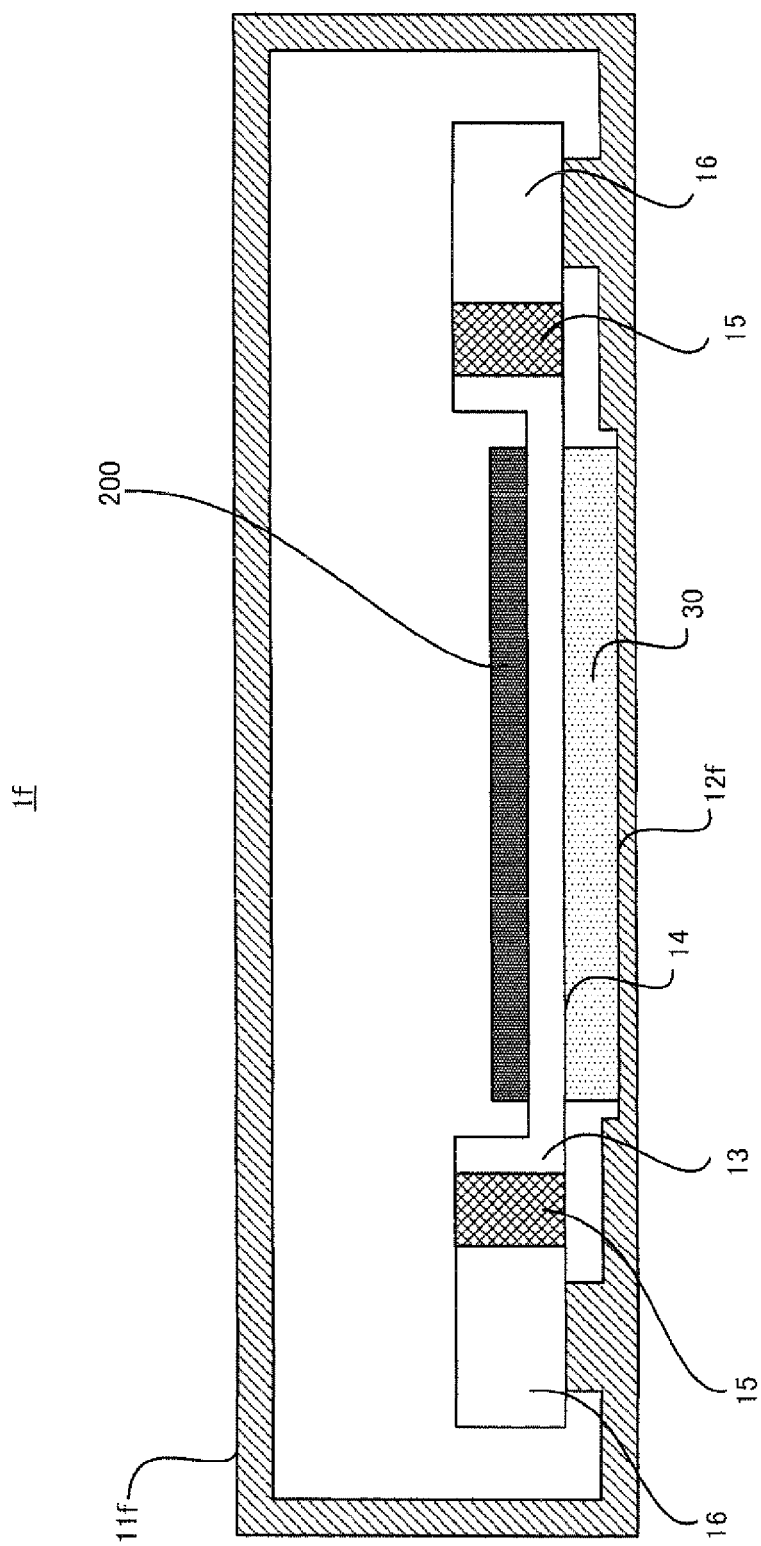

[FIG. 10]
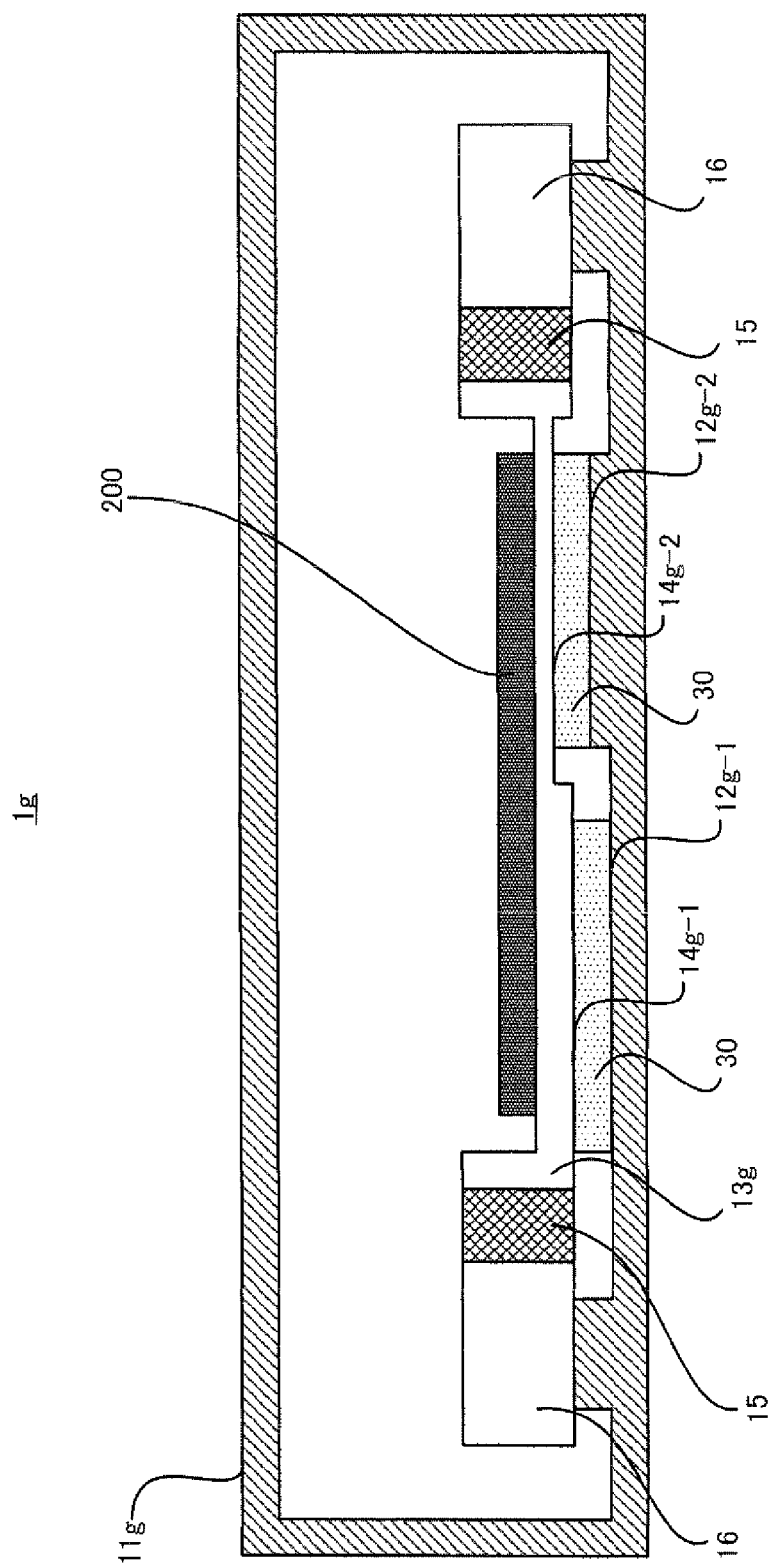

[FIG. 11]
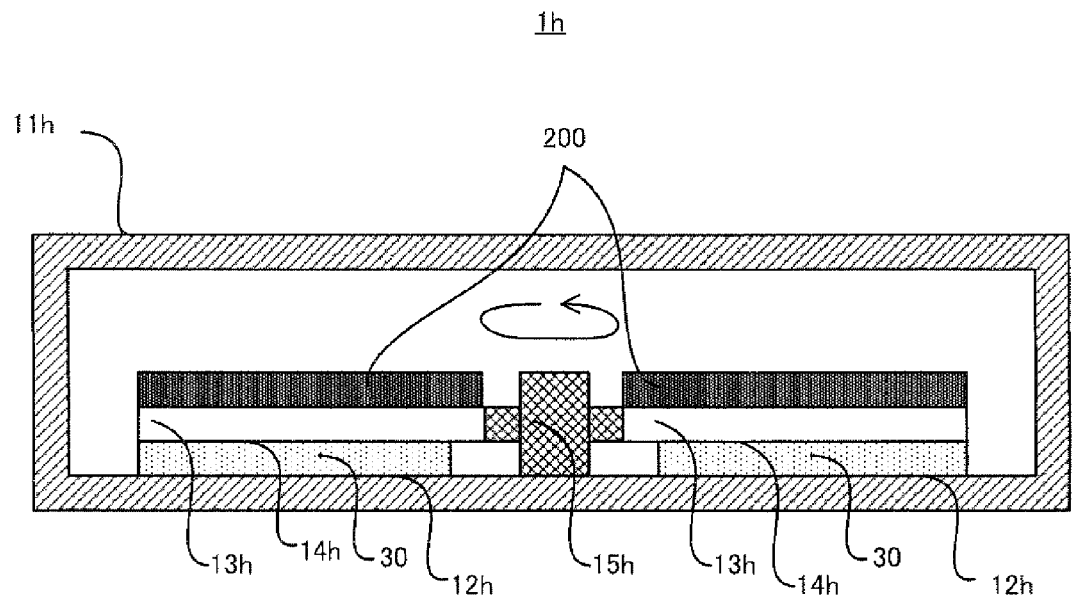
(a)
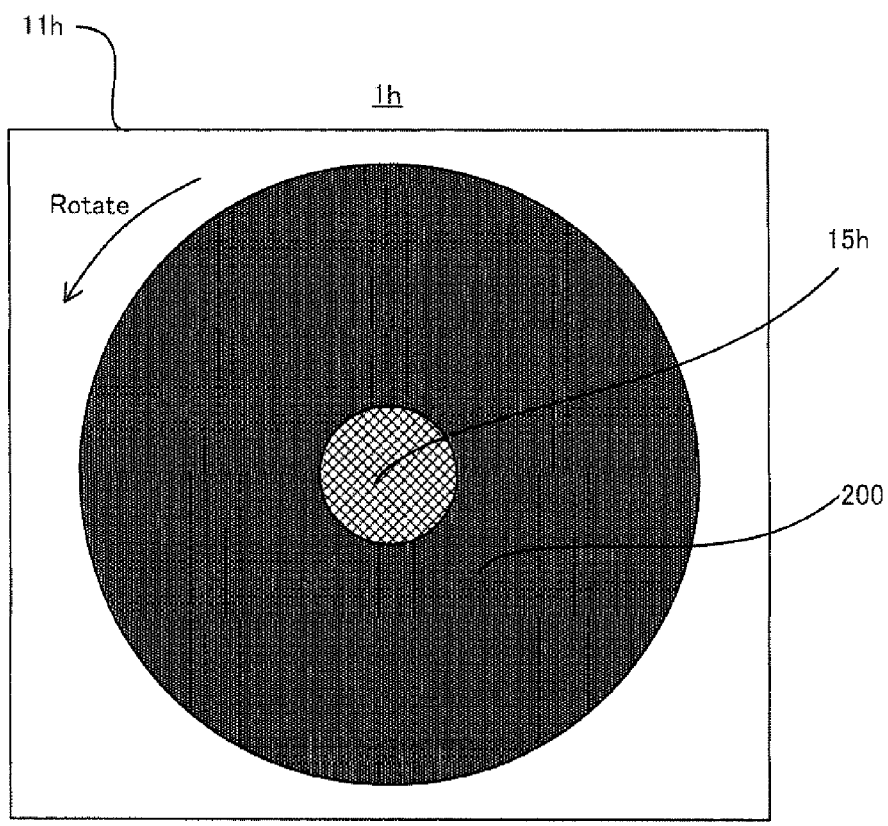
(b)

[FIG. 12]
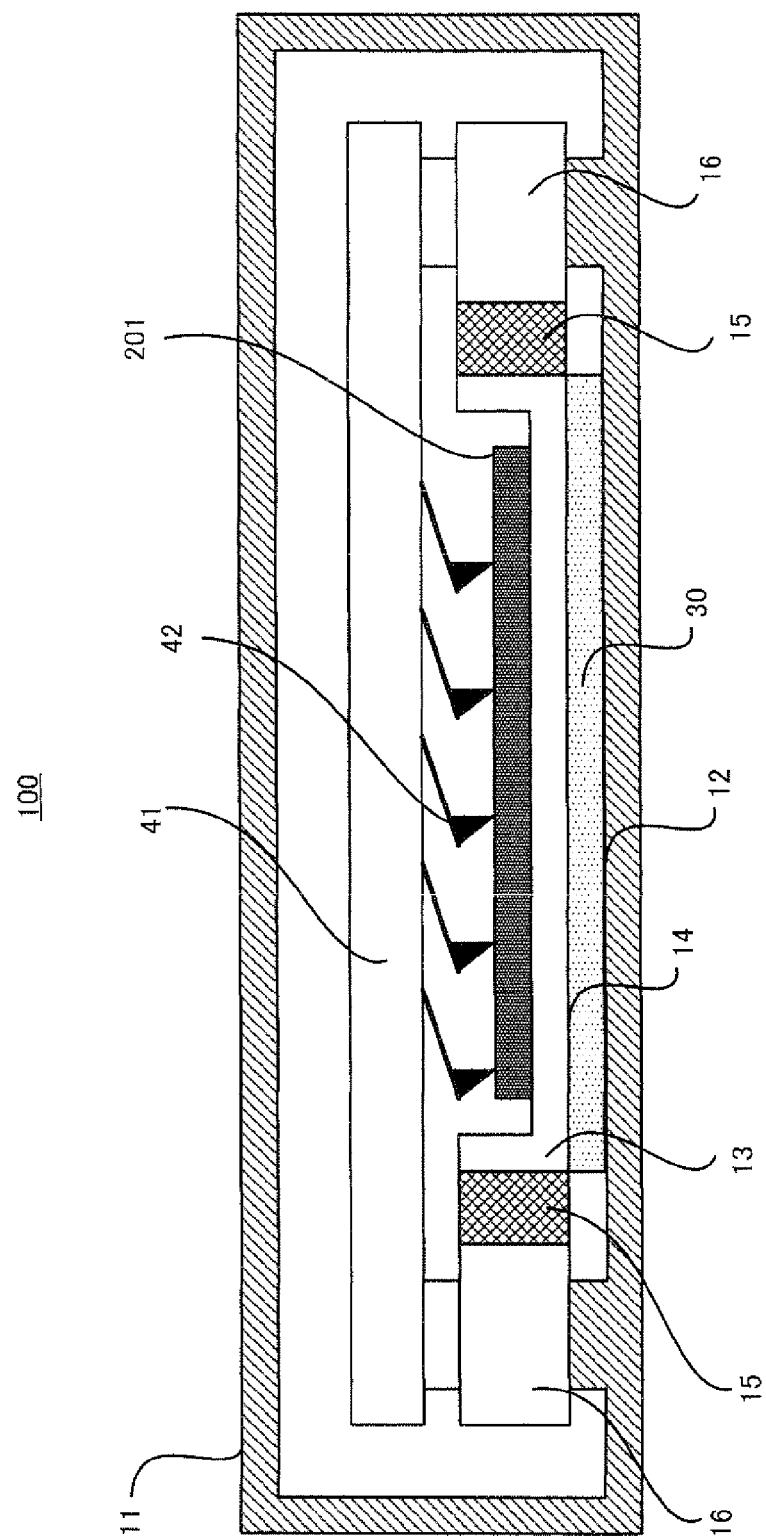

[FIG. 13]
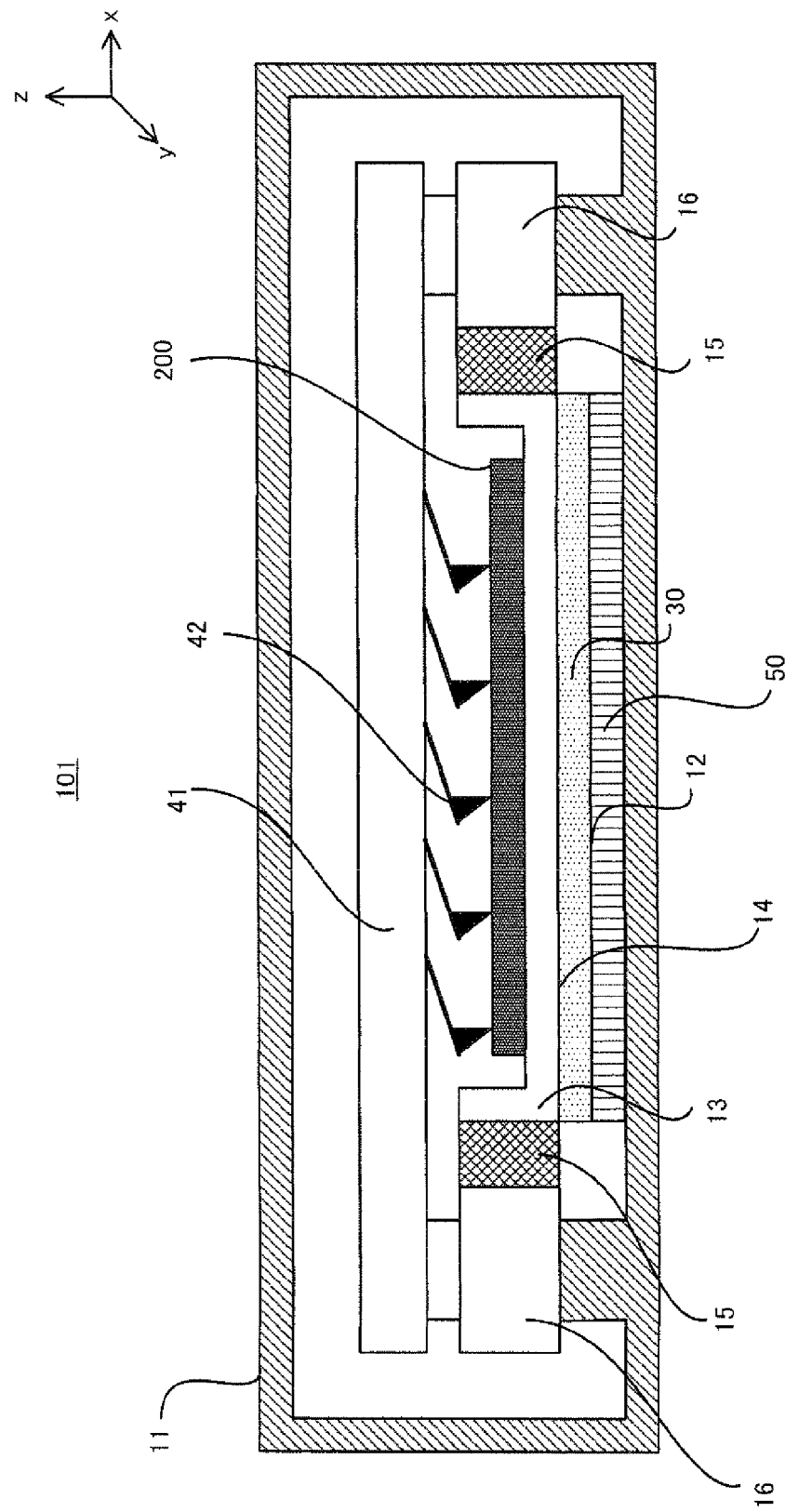

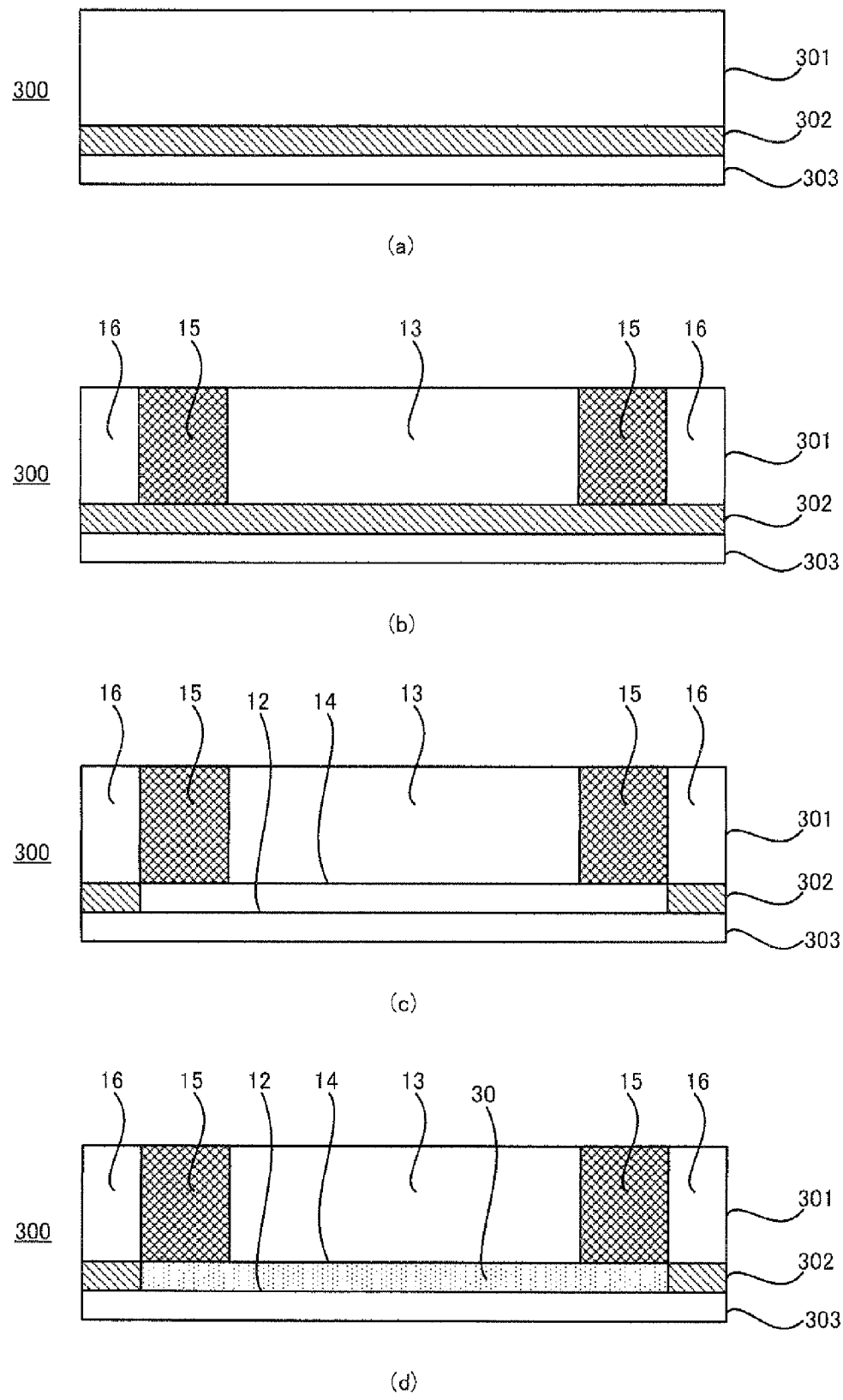
[FIG. 14]

DRIVING APPARATUS AND RECORDING/REPRODUCING APPARATUS

This application is the U.S. national phase of International Application No. PCT/JP2006/317364, filed 1 Sep. 2006, the entire contents of which is hereby incorporated by reference.

TECHNICAL FIELD

The present invention relates to, for example, a driving apparatus for driving a driven object such as a medium, and a recording/reproducing apparatus for recording and reproducing information with respect to a recording medium while driving the recording medium using such a driving apparatus.

BACKGROUND ART

For example, development has advanced on such a probe memory that records data onto a recording medium or that reproduces the data recorded on the recording medium, using each of a plurality of probes, by displacing the recording medium along a recording surface of the recording medium with respect to the probe array including the plurality of probes.

As such a probe memory, for example, as disclosed in a patent document 1, the following probe memory can be listed as one specific constituent example: a probe memory in which a first substrate, a second substrate, and a third substrate are connected through spacers, wherein the first substrate is provided with a plurality of probe units, the second substrate is provided with a mover-side electrode and an elastic part which is formed by removing one portion of the substrate between a central portion provided with a recording film and a surrounding portion located around the central portion, and the third substrate is provided with a stator-side electrode. In this probe memory the central portion of the second substrate provided with the recording film is driven (i.e. displaced) by applying a voltage between the stator-side electrode and the mover-side electrode to thereby use the elastic part.

Patent document 1: Japanese Patent Application Laid Open NO. Hei 10-40597

DISCLOSURE OF INVENTION

Subject to be Solved by the Invention

However, the aforementioned probe memory does not have a structure for supporting the recording film, which is a driven part driven by a force acting in the lamination direction of the substrates (i.e. a direction orthogonal or perpendicular to the horizontal surface). The recording film, which is the driven part, is supported by a force of the elastic part acting in a direction crossing the lamination direction of the substrates (i.e. a direction parallel to the horizontal surface); namely, the recording film, which is the driven part, is constructed as if it floated in the air in the lamination direction of the substrates. Thus, there is such a technical problem that the position of the recording film, which is the driven part, in the lamination direction of the substrates is possibly changed without intentions. In other words, there is such a technical problem that even if it is tried to drive the driven part by a desired amount in the direction parallel to the horizontal surface, the deflection, distortion, or the like of the elastic part, which can be caused by the drive, possibly causes the unintentional change in the position of the driven part in the perpendicular direction to the horizontal surface. Such a technical problem leads to lower accuracy in micro devices such as MEMS (Micro Electro Mechanical Systems) in which the driven part needs to be driven in units of millimeters, micrometers, or nanometers, and it is not preferable.

In view or the aforementioned problems, it is therefore an object of the present invention to provide, for example, a driving apparatus which can preferably drive a driven part, and a recording/reproducing apparatus which is provided with such a driving apparatus.

Means for Solving the Subject

The above object of the present invention can be achieved by a driving apparatus according to claim 1, provided with: a fixed part having a fixed-part plane; and a driven part having a driven-part plane, which faces the fixed-part plane, and driven in a direction substantially parallel to the fixed-part plane, a liquid lubricant being between the fixed-portion plane and the driven-part plane, the driven-part plane facing the fixed-part plane such that the driven-part plane is substantially parallel to the fixed-part plane.

The above object of the present invention can be achieved by a recording/reproducing apparatus according to claim 11, provided with: a fixed part having a fixed-part plane; and a driven part having a driven-part plane, which faces the fixed-part plane, and driven in a direction substantially parallel to the fixed-part plane, a liquid lubricant being between the fixed-portion plane and the driven-part plane, the driven-part plane facing the fixed-part plane such that the driven-part plane is substantially parallel to the fixed-part plane, the driven part being equipped with a recording medium, the fixed part being equipped with one or a plurality of recording/reproducing devices.

The operation and other advantages of the present invention will become more apparent from the embodiments explained below.

BRIEF DESCRIPTION OF DRAWINGS

FIG. 1 is a cross sectional view conceptually showing the structure of a driving apparatus in a first example.

FIG. 2 is a cross sectional view conceptually showing an aspect when a driven part provided for the driving apparatus in the first example is displaced.

FIG. 3 is a cross sectional view conceptually showing the structure of a driving apparatus in a second example.

FIG. 4 is a top view conceptually showing the structure when the driving apparatus in the second example is observed in a z-direction.

FIG. 5 is a cross sectional view conceptually showing the structure of a driving apparatus in a third example.

FIG. 6 is a cross sectional view conceptually showing the structure of a driving apparatus in a fourth example.

FIG. 7 is a cross sectional view conceptually showing the structure of a driving apparatus in a fifth example.

FIG. 8 is a cross sectional view conceptually showing the structure of a driving apparatus in a sixth example.

FIG. 9 is a cross sectional view conceptually showing the structure of a driving apparatus in a seventh example.

FIG. 10 is a cross sectional view conceptually showing the structure of a driving apparatus in an eighth example.

FIG. 11 are cross sectional views conceptually showing the structure of a driving apparatus in a ninth example.

FIG. 12 is a cross sectional view conceptually showing a first structure of a recording/reproducing apparatus in an example FIG. 13 is a cross sectional view conceptually showing a second structure of the recording/reproducing apparatus in the example.

FIG. 14 are cross sectional views conceptually showing the manufacturing process of the driving apparatus in the first example.

DESCRIPTION OF REFERENCE CODES 1 driving apparatus
11 case
12 fixed-part plane
13 driven part
14 driven-part plane
15 actuator
16 reference part
30 lubricant
41 probe head
42 probe
50 actuator
100, 101 recording/reproducing apparatus
200 driven object
201 recording medium
300 SOI substrate
301, 303 silicon layer
302 silicon dioxide layer

BEST MODE FOR CARRYING OUT THE INVENTION

Hereinafter, as the best mode for carrying out the invention, an explanation will be given on embodiments of the driving apparatus and the recording/reproducing apparatus of the present invention.

(Embodiment of Driving Apparatus)

An embodiment of the driving apparatus of the present invention is a driving apparatus provided with: a fixed part having a fixed-part plane; and a driven part having a driven-part plane, which faces the fixed-part plane, and driven in a direction substantially parallel to the fixed-part plane, a liquid lubricant being between the fixed-portion plane and the driven-part plane, the driven-part plane facing the fixed-part plane such that the driven-part plane is substantially parallel to the fixed-part plane.

According to the embodiment of the driving apparatus of the present invention, it is provided with the fixed part and the driven part which is driven (i.e. displaced) with respect to the fixed part. The fixed part has the fixed-part plane, and the driven part has the driven-part plane. In other words, the fixed part and the driven part have the respective planes at mutually facing positions. In other words, the fixed part and the driven part are constructed such that mutually facing portions are planar. Incidentally, the "plane" in the embodiment broadly includes a surface which can be regarded as the plane as a whole even if the surface has unevenness, a hole, or the like, as well as a literally pure plane. Moreover, each of the fixed-part plane and the driven-part plane may have a plurality of planes of different heights. In short, the shapes of the portions in which the fixed part faces the driven part only need to be planar in these portions. Then, the driven part is driven in the direction substantially parallel to the fixed-part plane, for example, by the action of an actuator or the like.

In the embodiment, in particular, the liquid lubricant exists at the space between the fixed part and the driven part; namely, the fixed-part plane faces the driven-part plane in the direction substantially parallel to the normal line of the fixed-part plane (in other words, in a direction of crossing or substantially perpendicular to a direction that the driven device is driven) through the liquid lubricant. At this time, all or part of the space between the fixed-part plane and the driven-part plane may be filled with the liquid lubricant. Since the liquid lubricant exists between the fixed-part plane and the driven-part plane, the driven-part plane faces the fixed-part plane such that the driven-part plane is substantially parallel to the fixed-part plane.

This makes it possible to preferably drive the driven part in the direction substantially parallel to the fixed-part plane. Moreover, since the liquid lubricant allows the distance between the driven-part plane and the fixed-part plane to be kept almost constant, substantially constant, or always constant, it is possible to preferably prevent such a disadvantage that the position of the driven part is changed in the substantially orthogonal direction to the fixed-part plane.

In addition, the liquid lubricant allows the driven part to be supported in a form of so-called surface shape with respect to the fixed part. Thus, even if the driven part is thinned, the liquid lubricant allows the driven part to maintain the planarity, strength, and the like. This makes it possible to relatively reduce the driven part in size or thickness. The construction that the driven part is relatively reduced in size or thickness is a great advantage in a micro domain such as MEMS.

Moreover, since the driven part can be relatively reduced in size or thickness, it is possible to preferably drive the driven part even if a driving force necessary to drive the driven part is relatively reduced; namely, it is possible to relatively reduce the driving force to drive the driven part. This allows achievement of the simplified and miniaturized actuator which supplies the driving force necessary to drive the driven part. The simplified and miniaturized structure as described above is a great advantage in the micro device such as MEMS.

As described above, according to the embodiment of the driving apparatus in the embodiment, it is possible to preferably drive the driven part.

In one aspect of the embodiment of the driving apparatus of the present invention, there is a balance among (i) a surface tension that driven-part plane receives in a direction of crossing the driven-part plane from the lubricant, (ii) a repulsion that the driven-part plane receives in a direction of crossing the driven-part plane from the lubricant, and (iii) a force that the driven-part plane receives in the direction of crossing the driven-part plane from an element other than the lubricant.

According to this aspect, regardless of the direction or aspect in which the driving apparatus is placed, the liquid lubricant allows the distance between the driven-part plane and the fixed-part plane to be kept almost constant, substantially constant, or always constant. Thus, it is possible to preferably prevent such a disadvantage that the position of the driven part is changed in the substantially orthogonal direction to the fixed-part plane.

In another aspect of the embodiment of the driving apparatus of the present invention, the driven-part plane forms a depression with respect to a surface of the driven part in a surrounding of the driven-part plane.

According to this aspect, it is possible to relatively reduce the driven part in size or thickness. Even if the driving part is reduced in size or thickness, the liquid lubricant allows the driven part to maintain the planarity, strength, and the like.

Moreover, if the liquid lubricant is provided for the portion which forms the depression (i.e. the driven-part plane), it is possible to relatively increase the degree of freedom of the design for a portion other than the portion which forms the depression. More specifically, the size, shape, or the like of the portion other than the portion which forms the depression can be determined without consideration of the liquid lubricant.

Incidentally, the "depression" in the present invention indicates a portion which is relatively thin compared to another portion (more specifically, which is relatively thin in the substantially orthogonal direction to the fixed-part plane). In other words, this aspect indicates that the thickness of the driven-part plane provided with the liquid lubricant is less than the thickness of the portion other than the driven-part plane. In the meanwhile, the depression has an arbitrary shape.

In another aspect of the embodiment of the driving apparatus of the present invention, the driven-part plane forms a projection with respect to a surface of the driven part in a surrounding of the driven-part plane.

According to this aspect, if the liquid lubricant is provided for the portion which forms the projection (i.e. the driven-part plane), it is possible to relatively increase the degree of freedom of the design for a portion other than the portion which forms the projection. More specifically, the size, shape, or the like of the portion other than the portion which forms the projection can be determined without consideration of the liquid lubricant.

Incidentally, the "projection" in the present invention indicates a portion which is relatively thick compared to another portion (more specifically, which is relatively thick in the substantially orthogonal direction to the fixed-part plane). In other words, this aspect indicates that the thickness of the driven-part plane provided with the liquid lubricant is greater than the thickness of the portion other than the driven-part plane. In the meanwhile, the projection has an arbitrary shape.

In another aspect of the embodiment of the driving apparatus of the present invention, the fixed-part plane forms a depression with respect to a surface of the fixed part in a surrounding of the fixed-part plane.

According to this aspect, the fixed part can be relatively reduced in size or thickness. Even if the fixed part is relatively reduced in size or thickness, the liquid lubricant allows the fixed portion to maintain the planarity, strength, and the like, so no disadvantage occurs.

Moreover, if the liquid lubricant is provided for the portion which forms the depression (i.e. the fixed-part plane), it is possible to relatively increase the degree of freedom of the design for a portion other than the portion which forms the depression. More specifically, the size, shape, or the like of the portion other than the portion which forms the depression can be determined without consideration of the liquid lubricant.

In another aspect of the embodiment of the driving apparatus of the present invention, the fixed-part plane forms a projection with respect to a surface of the fixed part in a surrounding of the fixed-part plane.

According to this aspect, if the liquid lubricant is provided for the portion which forms the projection (i.e. the fixed-part plane), it is possible to relatively increase the degree of freedom of the design for a portion other than the portion which forms the projection. More specifically, the size, shape, or the like of the portion other than the portion which forms the projection can be determined without consideration of the liquid lubricant.

In another aspect of the embodiment of the driving apparatus of the present invention, the driven-part plane forms a depression with respect to a surface of the driven part in a surrounding of the driven-part plane, and the fixed-part plane forms a projection, which corresponds to the depression, with respect to a surface of the fixed part in a surrounding of the fixed-part plane.

According to this aspect, the driven-part plane which forms the depression is fitted in the fixed-part plane which makes the projection. Thus, the space between the driven-part plane and the fixed-part plane can be preferably filled with the liquid lubricant, and it is possible to preferably prevent an unintentional outflow of the liquid lubricant.

In another aspect of the embodiment of the driving apparatus of the present invention, the driven-part plane forms a projection with respect to a surface of the driving part in a surrounding of the fixed-part plane, and the fixed-part plane forms a depression, which corresponds to the projection, with respect to a surface of the fixed part in a surrounding of the fixed-part plane.

According to this aspect, the driven-part plane which forms the projection is fitted in the fixed-part plane which forms the depression. Thus, the space between the driven-part plane and the fixed-part plane can be preferably filled with the liquid lubricant, and it is possible to preferably prevent an unintentional outflow of the liquid lubricant.

In another aspect of the embodiment of the driving apparatus of the present invention it is further provided with a driving mechanism for driving the fixed part in a substantially orthogonal direction to the fixed-part plane.

According to this aspect, it is possible to drive the driven-part plane in a planar manner in the direction substantially parallel to the fixed-part plane, and to drive the fixed part in the substantially orthogonal direction to the fixed-part plane. As a result, it is possible to drive the driven-part plane, so-called three-dimensionally.

While the driven-part plane is driven three-dimensionally, the liquid lubricant makes it possible to receive the aforementioned various advantageous effects.

In another aspect of the embodiment of the driving apparatus of the present invention, each of the fixed part and the driven part is formed of a same substrate.

According to this aspect, since each of the fixed part and the driven part can be formed of the same substrate, the driving apparatus can be manufactured at low cost.

(Embodiment of Recording/Reproducing Apparatus)

An embodiment of the recording/reproducing apparatus of the present invention is a recording/reproducing apparatus provided with: a fixed part having a fixed-part plane; and a driven part having a driven-part plane, which faces the fixed-part plane, and driven in a direction substantially parallel to the fixed-part plane, a liquid lubricant being between the fixed-portion plane and the driven-part plane, the driven-part plane facing the fixed-part plane such that the driven-part plane is substantially parallel to the fixed-part plane, the driven part being equipped with a recording medium, the fixed part being equipped with one or a plurality of recording/reproducing devices.

According to the embodiment of the recording/reproducing apparatus of the present invention, the recording medium equipped for the driven part is displaced in the direction substantially parallel to the fixed-part plane. The recording/reproducing device equipped for the fixed part allows information recording/reproduction with respect to the recording medium. Therefore, it is possible to record and reproduce the information with respect to the recording medium while receiving various benefits of the aforementioned embodiment of the driving apparatus of the present invention.

Incidentally, the one or the plurality of recording/reproducing devices may be equipped for the fixed part directly or indirectly through some member(s) or the like between the recording/reproducing device(s) and the fixed portion.

Incidentally, in response to various aspects of the aforementioned embodiment of the driving apparatus of the present invention, the embodiment of the recording/reproducing apparatus of the present invention can also adopts various aspects.

The operation and other advantages of the present invention will become more apparent from the examples explained below.

As explained above, according to the embodiment of the driving apparatus of the present invention, it is provided with the fixed part having the fixed-part plane and the driven part having the driven-part plane, the liquid lubricant being between the fixed-part plane and the driven-part plane. Therefore, it is possible to preferably drive the driven part.

EXAMPLES

Hereinafter, examples of the present invention will be explained on the basis of the drawings.

(1) First Example

Firstly, with reference to FIG. 1 and FIG. 2, the first example of the driving apparatus of the present invention will be explained. FIG. 1 is a cross sectional view conceptually showing the structure of the driving apparatus in the first example. FIG. 2 is a cross sectional view conceptually showing an aspect when a driven part provided for the driving apparatus in the first example is displaced.

As shown in FIG. 1, a driving apparatus 1 in the first example is provided with a case 11 in a box shape having a fixed-part plane 12 inside. The case 11 has, for example, a size on the order of millimeters, micrometers, or nanometers; namely, the driving apparatus 1 in the first example corresponds to a micro device such as MEMS.

The case 11 is provided with a driven part 13 having a driven-part plane 14 which faces the fixed-part plane 12, in a position facing the fixed-part plane 12 from among the inside thereof.

The driven part 13 is connected to a reference part 16 joined to the case 11, through an actuator 15. The actuator 15 displaces (i.e. drives) the driven part 13 in directions substantially parallel to the fixed-part plane 12 (specifically, an x-direction and a y-direction in FIG. 1). At this time, the reference part 16 indicates a reference of position when the driven part 13 is displaced. The actuator 15 may use various driving methods such as electrostatic drive, electromagnetic drive, and mechanical drive, to displace the driven part 13. Incidentally, for example, a driven object 200 such as a recording medium described later is mounted on the stage of the driven part 13.

In the first example, in particular, the space between the fixed-part plane 12 and the driven-part plane 14 is filled with a liquid lubricant 30 such that the fixed-part plane 12 is substantially parallel to the driven-part plane 14. The liquid lubricant 30 preferably has lubricity and a relatively high surface tension. However, even without such properties, any liquid or gel that has lubricity and that has a relatively low surface tension may be used as the lubricant 30, or any liquid or gel that does not have lubricity and that has a relatively high surface tension may be used as the lubricant 30. Alternatively, various types of liquid or gel that have other properties may be used as the lubricant 30. In the first example, as such a liquid lubricant 30, for example, Fomblin is used. Of course, it is obvious that a liquid or gel other than Fomblin may be used as the lubricant 30.

As described above, since the space between the fixed-part plane 12 and the driven-part plane 14 is filled with the liquid lubricant 30, the driven part 13 can be preferably displaced in the direction substantially parallel to the fixed-part plane 12 while the fixed-part plane 12 and the driven-part plane 14 are kept substantially parallel.

Specifically, as shown in FIG. 2, while the fixed-part plane 12 and the driven-part plane 14 are kept substantially parallel, the driven part 13 can be displaced to the left in FIG. 2 (i.e. in the x-direction). Of course, it is obvious that while the fixed-part plane 12 and the driven-part plane 14 are kept substantially parallel, the driven part 13 can be displaced to the right in FIG. 2 (i.e. in the x-direction), to the front side (i.e. in the y-direction), and to the rear side (i.e. in the y-direction).

Moreover, the lubricant 30 allows the distance between the fixed-part plane 12 and the driven-part plane 14 to be kept almost constant, substantially constant, or always constant without making the driven part 13 what is called float in the air. Thus, it is possible to preferably prevent such a disadvantage that the position of the driven part 13 is changed without intentions in the substantially orthogonal direction to the fixed-part plane 12 and the driven-part plane 14 (i.e. a vertical direction in FIG. 1 and hereinafter referred to as a "z-direction" as occasion demands). Moreover, the meniscus force of the lubricant 30 can preferably prevent such a disadvantage that the driven 13 floats off the case 11 (i.e. a gap other than the lubricant 30 is generated between the driven-part plane 14 and the fixed-part plane 12).

Incidentally, in the first example, the following equation holds true:

$$Fa(z)+Fr(z)+Ksz+mg\cos\theta+ma\cos\theta=0,$$

wherein $Fa(z)$ is a z-direction component of an attraction applied to the driven part 13 by the surface tension of the lubricant 30, $Fr(z)$ is a z-direction component of a repulsion applied to the driven part 13 by the lubricant 30, $Ksz$ is a z-direction component of a force applied to the driven part 13 by the actuator 15 if the actuator 15 is regarded as a cross spring, $mg\cos\theta$ is a z-direction component of the gravity applied to the driven part 13, and $ma\cos\theta$ is a z-direction component of the inertial force applied to the driven part 13 by the driven part 13 accelerating. This indicates that the position in the z-direction of the driven part 13 is stabilized independently of the direction of the driving apparatus 1 and whether or not the driving apparatus 1 remains stationary. More specifically, it indicates that the position in the z-direction of the driven part 13 is stabilized, whether the driving apparatus 1 is placed upside down, diagonally, or not.

Moreover, the aforementioned equation indicates that the position in the z-direction of the driven part 13 is stabilized even if there is large impact applied to the driving apparatus 1 (F=ma). In other words, the driving apparatus 1 in the first example has an advantage of high impact resistance.

In addition, the liquid lubricant 30 allows the driven part 13 to be supported in a form of surface with respect to the case 11 (more specifically, the fixed-part plane 12). Thus, even if the driven part 13 is thinned, the lubricant 30 allows the driven part 13 to maintain the planarity, strength, to and the like. This makes it possible to relatively reduce the driven part 13 in size or thickness. The construction that the driven part 13 is relatively reduced in size or thickness is a great advantage in the micro domain such as MEMS, which needs to be provided with many constituents in a limited space.

Moreover, since the driven part 13 can be relatively reduced in size or thickness, the mass of the driven part 13 is inevitably reduced. This makes it possible to preferably drive the driven part 13 even if a driving force necessary to drive the driven part 13 is relatively reduced. In addition, since the fixed-part plane 12 and the driven-part plane 14 are neither directly a real-contacted nor connected by a structure such as a spring, even if the driving force necessary to drive the driven part 13 is relatively reduced, it is possible to preferably drive the driven part 13; namely, it is possible to relatively reduce the driving force necessary to drive the driven part 13. This allows achievement of the simplified and miniaturized actuator 15 which supplies the driving force necessary to drive the driven part 13. The simplified and miniaturized structure as described above is a great advantage in the micro device such as MEMS.

Moreover, since the mass of the driven part 13 can be reduced, the forces (i.e. the aforementioned ma and mg) applied to the driven part 13 by external causes such as gravity and acceleration are reduced. Thus, it is possible to properly eliminate the adverse effect by external causes when the driven part 13 is driven. This makes it possible to receive an advantage of increasing the driving accuracy of the driven part 13.

Incidentally, the driven part 13 (in particular, the portion thereof in which the driven object 200 is mounted) maintains the planarity and the strength by virtue of the lubricant 30, so the driven part 13 may be thinned to the extent that the plane cannot be maintained if not being supported by the fixed-part plane 12 through the lubricant 30. For example, the driven part 13 may be thinned to 10 micrometers or less.

Moreover, in FIG. 1 and FIG. 2, the space between the fixed-part plane 12 and the driven-part plane 14 is filled with the lubricant 30, however, at least one portion of the space between the fixed-part plane 12 and the driven-part plane 14 may be filled with the lubricant 30.

Moreover, the fixed-part plane 12 and the driven-part plane 14 are not necessarily pure planes, and there may be unevenness or the like. It is only necessary that the fixed-part plane 12 and the driven-part plane 14 can be regarded as the planes as a whole.

Moreover, in order to prevent a disadvantage of outflow of the lubricant 30 without intentions (more specifically, an outflow of the lubricant 30 into a space other than the space that is originally to be filled with the lubricant 30), a closed space is preferably filled with the lubricant 30. In order to realize such construction, for example, as explained in the following second to eighth examples, the driven-part plane 14 and the fixed-part plane 12 are formed to have a projection or depression in shape, by which the closed space formed by the projection and the depression may be filled with the lubricant 30. Alternatively, the lubricant 30 is encapsulated in a saclike container or the like and the container or the like is attached on the driven-part plane 14 and the fixed-part plane 12, by which the closed space formed by the container or the like may be filled with the lubricant 30. Alternatively, side walls or the like are provided to be filled with the lubricant 30 between the driven-part plane 14 and the fixed-part plane 12, by which the closed space formed by the driven-part plane 14, the fixed-part plane 12, and the side walls or the like (moreover, the aforementioned projection and depression) may be filled with the lubricant 30.

(2) Second Example

Next, with reference to FIG. 3, the second example of the driving apparatus of the present invention will be explained. FIG. 3 is a cross sectional view conceptually showing the structure of the driving apparatus in the second example. Incidentally, the same constituents as those of the driving apparatus 1 in the first example carry the same numerical references, and the detailed explanation thereof will be omitted.

As shown in FIG. 3, a driving apparatus 1a in the second example is provided with the case 11 having the fixed-part plane 12, as in the driving apparatus 1 in the first example.

In the driving apparatus 1a in the second example, in particular, a driven-part plane 14a forms a depression with respect to a surrounding portion of the driven-part plane 14a.

This makes it possible to receive the same various advantageous effects as those received by the driving apparatus 1 in the first example, and also makes it possible to further thin the driven part 13a. Along with that, the driving force necessary to drive the driven part 13a can be relatively reduced.

Moreover, since the lubricant 30 is in contact with the driven-part plane 14a which forms the depression, it is possible to relatively increase the degree of freedom of the design for a portion other than the driven-part plane 14a (i.e. a portion without contact with the lubricant 30). More specifically, the sizes shape, or the like of the portion other than the driven-part plane 14a can be determined without consideration of the lubricant 30.

With reference to FIG. 4, the surrounding portion of the driven-part plane 14a will be explained, more specifically. FIG. 4 is a top view conceptually showing the structure when the driving apparatus in the second example is observed in a z-direction.

As shown in FIG. 4, the "surrounding portion of the driven-part plane 14a" denotes a partial area of the driven part 13a which surrounds the driven-part plane 14a, and more preferably a partial area of the driven part 13a which surrounds the driven-part plane 14a and which is adjacent to the driven-part plane 14a. More specifically, the "surrounding portion of the driven-part plane 14a" denotes one portion of the area between the driven-part plane 14 and the actuator 15. In this case, the partial area of the driven part 13a which surrounds the driven-part plane 14a, which is the "surrounding portion of the driven-part plane 14a, may have an arbitrary size.

Incidentally, this is the same for a "driven-part plane 14b", a "driven-part plane 14d", and a "driven-part plane 14e" in the following explanation.

Moreover, in the following explanation, there is a description of a "surrounding portion of the fixed-part plane 12 (specifically, a fixed-part plane 12b, a fixed-part plane 12c, a fixed-part plane 12e, and a fixed-part plane 12f)". The "surrounding portion of the fixed-part plane 12", as in the "surrounding portion of the driven-part plane 14a", denotes a partial area of the case 11 which surrounds the fixed-part plane 12, and more preferably a partial area of the case 11 which surrounds the fixed-part plane 12 and which is adjacent to the fixed-part plane 12. In this case, the partial area of the case 11 which surrounds the fixed-part plane 12, which is the "surrounding portion of the fixed-part plane 12, may have an arbitrary size.

(3) Third Example

Next, with reference to FIG. 5, the third example of the driving apparatus of the present invention will be explained. FIG. 5 is a cross sectional view conceptually showing the structure of the driving apparatus in the third example. Incidentally, the same constituents as those of the driving apparatus 1 in the first example carry the same numerical references, and the detailed explanation thereof will be omitted.

As shown in FIG. 5, in a driving apparatus 1b in the third example, as in the driving apparatus 1a in the second example, a driven-part plane 14b forms a depression with respect to a surrounding portion of the driven-part plane 14b. In the driving apparatus 1b in the third example, moreover, a fixed-part plane 12b forms a projection with respect to the surrounding portion of the fixed-part plane 12b. The depression and projection are formed so that the projection formed by the fixed-part plane 12b is fitted in or engaged with the depression formed by the driven-part plane 14b.

This makes it possible to receive the various advantageous effects received by each of the driving apparatus 1 in the first example and the driving apparatus 1a in the second example.

In addition, since the projection formed by the fixed-part plane 12b is fitted in the depression formed by the driven-part plane 14b, the space between the driven-part plane 14b and the fixed-part plane 12b can be preferably filled with the lubricant 30. As a result, it is possible to preferably prevent an unintentional outflow of the lubricant 30 (specifically, an outflow into the portion other than the driven-part plane 14b and the fixed-part plane 12b).

(4) Fourth Example

Next, with reference to FIG. 6, the fourth example of the driving apparatus of the present invention will be explained. FIG. 6 is a cross sectional view conceptually showing the structure of the driving apparatus in the fourth example. Incidentally, the same constituents as those of the driving apparatus 1 in the first example carry the same numerical references, and the detailed explanation thereof will be omitted.

As shown in FIG. 6, a driving apparatus 1c in the fourth example, as in the driving apparatus 1 in the first example, is provided with the driven part 13 having the driven-part plane 14.

In the driving apparatus 1c in the fourth example, in particular, as in the driving apparatus 1b in the third example, a fixed-part plane 12c forms a projection with respect to the surrounding portion of the fixed-part plane 12c.

This makes it possible to receive the same benefits as those received by the driving apparatus 1 in the first example.

Moreover, since the lubricant 30 is in contact with the fixed-part plane 12c which forms the projection, it is possible to relatively increase the degree of freedom of the design for a portion other than the fixed-part plane 12c (i.e. a portion without contact with the lubricant 30). More specifically, the size, shape, or the like of the portion other than the fixed-part plane 12c can be determined without consideration of the lubricant 30.

(5) Fifth Example

Next, with reference to FIG. 7, the fifth example of the driving apparatus of the present invention will be explained. FIG. 7 is a cross sectional view conceptually showing the structure of the driving apparatus in the fifth example. Incidentally, the same constituents as those of the driving apparatus 1 in the first example carry the same numerical references, and the detailed explanation thereof will be omitted.

As shown in FIG. 7, a driving apparatus 1d in the fifth example, as in the driving apparatus 1 in the first example, is provided with the case 11 having the fixed-part plane 12.

In the driving apparatus 1d in the fifth example, in particular, a driven-part plane 14d forms a projection with respect to a surrounding portion of the driven-part plane 14d. In other words, the driven-part plane 14d is formed so as to form the projection on the bottom side of the driven part 13.

This makes it possible to receive the same various advantageous effects as those received by the driving apparatus 1 in the first example.

Moreover, since the lubricant 30 is in contact with the driven-part plane 14d which forms the projection, it is possible to relatively increase the degree of freedom of the design for a portion other than the driven-part plane 14d (i.e. a portion without contact with the lubricant 30). More specifically, the size, shape, or the like of the portion other than the driven-part plane 14d can be determined without consideration of the lubricant 30.

(6) Sixth Example

Next, with reference to FIG. 8, the sixth example of the driving apparatus of the present invention will be explained. FIG. 8 is a cross sectional view conceptually showing the structure of the driving apparatus in the sixth example. Incidentally, the same constituents as those of the driving apparatus 1 in the first example carry the same numerical references, and the detailed explanation thereof will be omitted.

As shown in FIG. 8, in a driving apparatus 1e in the sixth example, as in the driving apparatus 1d in the fifth example, a driven-part plane 14e forms a projection with respect to a surrounding portion of the driven-part plane 14e. In the driving apparatus 1e in the sixth example, moreover, a fixed-part plane 12e forms a projection with respect to the surrounding portion of the fixed-part plane 12e. The depression and projection are formed so that the projection formed by the driven-part plane 14e is fitted in or engaged with the depression formed by the fixed-part plane 12e.

This makes it possible to receive the various advantageous effects received by each of the driving apparatus 1 in the first example and the driving apparatus 1d in the fifth example.

In addition, since the projection formed by the driven-part plane 14e is fitted in the depression formed by the fixed-part plane 12e, the space between the driven-part plane 14e and the fixed-part plane 12e can be preferably filled with the lubricant 30. As a result, it is possible to preferably prevent an unintentional outflow of the lubricant 30 (specifically, an outflow into the portion other than the driven-part plane 14e and the fixed-part plane 12e).

(7) Seventh Example

Next, with reference to FIG. 9, the seventh example of the driving apparatus of the present invention will be explained. FIG. 9 is a cross sectional view conceptually showing the structure of the driving apparatus in the seventh example. Incidentally, the same constituents as those of the driving apparatus 1 in the first example carry the same numerical references, and the derailed explanation thereof will be omitted.

As shown in FIG. 9, a driving apparatus 1f in the seventh example, as in the driving apparatus 1 in the first example, is provided with a driven part 13f having a driven-part plane 14f.

In the driving apparatus if in the seventh example, in particular, as in the driving apparatus 1e in the sixth example, a fixed-part plane 12f forms a depression with respect to the surrounding portion of the fixed-part plane 12f.

This makes it possible to receive the same benefits as those received by the driving apparatus 1 in the first example.

Moreover, since the lubricant 30 is in contact with the fixed-part plane 12f which forms the depression, it is possible to relatively increase the degree of freedom of the design for a portion other than the fixed-part plane 12f (i.e. a portion without contact with the lubricant 30). More specifically, the size, shape, or the like of the portion other than the fixed-part plane 12f can be determined without consideration of the lubricant 30.

(8) Eighth Example

Next, with reference to FIG. 10, the eighth example of the driving apparatus of the present invention will be explained. FIG. 10 is a cross sectional view conceptually showing the structure of the driving apparatus in the eighth example. Incidentally, the same constituents as those of the driving apparatus 1 in the first example carry the same numerical references, and the detailed explanation thereof will be omitted.

As shown in FIG. 10, a driving apparatus 1g in the eighth example is provided with a case 11g having a plurality of fixed-part planes 12g-1 and 12g-2 whose heights in the z-direction are different from each other. The driving apparatus 1g in the eighth example is also provided with a driven part 13g having a plurality of driven-part planes 14g-1 and 14g-2 whose heights in the z-direction are different from each other.

As described above, even if the fixed-part planes 12g and the driven-part planes 14g have portions of different heights in the z-direction, it is possible to preferably receive various advantageous effects received by the aforementioned driving apparatus 1 in the first example.

Of course, the fixed-part planes 12g and the driven-part planes 14g are not limited to having two portions of different heights in the z-direction; the fixed-part planes 12g and the driven-part planes 14g may have a plurality of portions whose heights in the z-direction are different from each other.

(9) Ninth Example

Next, with reference to FIG. 11, the ninth example of the driving apparatus of the present invention will be explained. FIG. 11 are a cross sectional view and a top view conceptually showing the structure of the driving apparatus in the ninth example. Incidentally, the same constituents as those of the driving apparatus 1 in the first example carry the same numerical references, and the detailed explanation thereof will be omitted.

As shown in FIG. 11(a) and FIG. 11(b), a driving apparatus 1h in the ninth example adopts a rotary drive method in which a disc-shaped driven part 13h rotates in a direction denoted by arrows in FIG. 11(a) and FIG. 11(b). Incidentally, FIG. 11(b) is a top view showing the driving apparatus 1h observed from the upper side in FIG. 11(a). Such a driving apparatus 1h is used in, for example, an optical disc drive, a hard disk drive, or the like.

The driving apparatus 1h in the ninth example, as in the driving apparatus 1 which adopts the aforementioned planar drive method, is provided with a case 11h having a fixed-part plane 12h; the disc-shaped driven device 13h having a disc-shaped driven-part plane 14h. The space between the fixed-part plane 12h and the driven-part plane 14h is filled with the liquid lubricant 30 so as to make the fixed-part plane 12h and the driven-part plane 14h substantially parallel.

By virtue of such construction, even in the driving apparatus 1h which adopts the rotary drive method, it is possible to preferably receive various advantageous effects received by the driving apparatus 1 in the first example which adopts the aforementioned planar drive method.

Incidentally, even the driving apparatus 1 in the ninth example can obviously receive the various advantageous effects received by each of the driving apparatuses 1a to 1g by adopting the aforementioned structures of the driving apparatus 1a in the second example to the driving apparatus 1g in the eight example.

(10) Recording/Reproducing Apparatus

Next, with reference to FIG. 12 and FIG. 13, an explanation will be given on a recording/reproducing apparatus in an example using the driving apparatuses in the aforementioned examples. FIG. 12 is a cross sectional view conceptually showing a first structure of the recording/reproducing apparatus in an example. FIG. 13 is a cross sectional view conceptually showing a second structure of the recording/reproducing apparatus in the example.

As shown in FIG. 12, a recording/reproducing apparatus 100 in the example is provided with the aforementioned driving apparatus 1 in the first example. The recording/reproducing apparatus 100 is further provided with a probe head 41 having a plurality of probes 42, which are connected to the reference part 16.

Each of the plurality of probes 42 constitutes one specific example of the "recording/reproducing device" of the present invention. Each of the plurality of probes 42 has a pointed tip, and data is recorded and reproduced with respect to a recording medium 201 by applying a voltage from the tip to the recording medium 201.

For example, in case of the recording/reproducing apparatus 100 using the SNDM (Scanning Nonlinear Dielectric Microscopy) principle, data denoted by the polarization direction of a ferroelectric substance is recorded by applying electric fields beyond the coercive electric field of the ferroelectric substance from the tips of the probes 42 to the recording medium 201 which is formed of the ferroelectric substance. On the other hand, in the reproduction, the data recorded as the polarization direction of the ferroelectric substance is read and reproduced by applying alternate electric fields to the ferroelectric substrate and detecting a difference in a capacitance Cs or a difference in a change in the capacitance Cs in a certain micro domain of the ferroelectric substance at that time.

Of course, the recording/reproducing apparatus is not limited to the apparatus using the SNDM principle but may be the apparatus using various methods.

At this time, in order to record data into a recording area at a desired position of the recording medium 201 or in order to reproduce the data recorded in the desired recording area of the recording medium, the driven part 13 with the recording medium 201 mounted thereon is displaced by the operation of the actuator 15.

Therefore, according to the recording/reproducing apparatus 100 in the example, it is possible to record and reproduce the data with respect to the recording medium 201 while receiving the various advantageous effects received by the aforementioned driving apparatus 1 in the first example.

Incidentally, even recording/reproducing apparatus 100 in the example can obviously receive the various advantageous effects received by each of the driving apparatuses 1a to 1g by adopting the aforementioned structures of the driving apparatus 1a in the second example to the driving apparatus 1g in the eighth example.

Moreover, in the recording/reproducing apparatus 100 in the example, the probe head 41 is disposed in the case 11 through the reference part 16. As described above, the probe head 41 may be indirectly disposed in the case 11 through a predetermined member. The probe head 41, however, may be directly disposed in the case 11. In short, there is no limit to the construction that the probe 41 is disposed in the case 11 as long as the probe head 41 is fixed to the case 11.

Incidentally, the recording/reproducing apparatus 100 shown in FIG. 12 displaces the recording medium 201 on the plane (i.e. in each of the x-direction and the y-direction). The recording medium 201, however, may be displaced in a so-called three-dimensional direction (i.e. in each of the x-direction, the y-direction, and the z-direction).

Specifically, as shown in FIG. 13, the recording/reproducing apparatus 100 may be provided with an actuator 50 for displacing the driven part 13 in the z-direction with the lubricant 30. In this case, the actuator 50 is fixed to the inner wall of the case 11, and the surface of the actuator 50 facing the driven-part plane 14 corresponds to the fixed-part plane 12.

By virtue of such construction, it is possible to displace the driven part 13 in the z-direction by the operation of the actuator 50 while receiving various advantage effects received by the driving apparatus 1 in the first example or the like. That is, while the driven part 13 is displaced in the z-direction by the operation of the actuator 50, it is possible to prevent such an unintentional change in the position of the driven part 13 in the z-direction that is caused by an element other than the operation of the actuator 50 (e.g. the operation of the actuator 13).

Incidentally, here, an explanation was given on such an example that the driving apparatus 1 in the first example to the driving apparatus 1h in the ninth example are applied to the recording/reproducing apparatus 100. However, the driving apparatus 1 in the first example to the driving apparatus 1h in the ninth example are not limited to being applied to the recording/reproducing apparatus; the apparatuses may be applied to a stage provided for an electron beam drawing apparatus, SEM (Scanning Electric Microscopy), SPM (Scanning Probe Microscopy), and the like. The driving apparatus 1 is preferably applied to the micro device.

(11) Manufacturing Process

Next, with reference to FIG. 14, a manufacturing process of the aforementioned driving apparatus 1 in the first example will be explained. FIG. 14 are cross sectional views conceptually showing the manufacturing process of the driving apparatus 1 in the first example.

As shown in FIG. 14(a), for the manufacturing of the driving apparatus 1 in the first example, a SOI (Silicon On Insulation) substrate is used in which a silicon dioxide layer 302 is sandwiched between a silicon layer 301 and a silicon layer 302.

As shown in FIG. 14(b), the actuator 15 is formed by performing a patterning process, an etching process, a deposition process, or the like. This results in the structure that the driven part 13 is connected to the reference part 16 joined to the case 11, through the actuator 15.

Then, as shown in FIG. 14(c), sacrifice layer etching is performed on the silicon dioxide layer 302, which is under the driven part 13 and the actuator 15, by which the space to be filled with the lubricant 30 is formed. The upper surface of the space is in contact with the driven-part plane 14 of the driven part 13, and the lower surface of the space is in contact with the fixed-part plane 12 of the case 11.

Then, as shown in FIG. 14(d), the space formed by the sacrifice layer etching is filled with the lubricant 30. By this, the driving apparatus 1 in the first example is manufactured.

By manufacturing the driving apparatus 1 in the first example from the single SOI substrate in this manner, it is no longer necessary to align the fixed-part plane 12 of the actuator 15 or the like (or the case 11). Moreover, it can save the trouble of incorporating the actuator 15 or the like. Therefore, it is possible to manufacture the driving apparatus 1 in the first example, relatively easily and simply.

Incidentally, the manufacturing process explained with reference to FIG. 14 is one specific example of the manufacturing process of the driving apparatus 1 in the first example. The driving apparatus 1 in the first example is obviously allowed to be manufactured in a manufacturing process other than the manufacturing process in the aspect shown in FIG. 14.

Moreover, it is obvious that the driving apparatus 1a in the second example to the driving apparatus 1h in the ninth example, and the recording/reproducing apparatuses 100 and 101 may be manufactured in the aspect shown in FIG. 14 or in a manufacturing process other than the manufacturing process in the aspect shown in FIG. 14, as in the driving apparatus 1 in the first example.

The present invention is not limited to the aforementioned examples, but various changes may be made, if desired, without departing from the essence or spirit of the invention which can be read from the claims and the entire specification. A driving apparatus, and a recording/reproducing apparatus, all of which involve such changes, are also intended to be within the technical scope of the present invention.

The invention claimed is:

1. A driving apparatus comprising:
   a fixed part having a fixed-part plane; and
   a driven part having a driven-part plane, which faces the fixed-part plane, and driven in a direction substantially parallel to the fixed-part plane,
   a liquid lubricant being between the fixed-portion plane and the driven-part plane,
   the driven-part plane facing the fixed-part plane such that the driven-part plane is substantially parallel to the fixed-part plane,
   wherein there is a balance among (i) a surface tension that driven-part plane receives in a direction of crossing the driven-part plane from the lubricant, (ii) a repulsion that the driven-part plane receives in a direction of crossing the driven-part plane from the lubricant, and (iii) a force that the driven-part plane receives in the direction of crossing the driven-part plane from an element other than the lubricant, and
   wherein each of said fixed part and said driven part is formed of a same substrate.

2. The driving apparatus according to claim 1, wherein the driven-part plane forms a depression with respect to a surface of said driven part in a surrounding of the driven-part plane.

3. The driving apparatus according to claim 1, wherein the driven-part plane forms a projection with respect to a surface of said driven part in a surrounding of the driven-part plane.

4. The driving apparatus according to claim 1, wherein the fixed-part plane forms a depression with respect to a surface of said fixed part in a surrounding of the fixed-part plane.

5. The driving apparatus according to claim 1, wherein the fixed-part plane forms a projection with respect to a surface of said fixed part in a surrounding of the fixed-part plane.

6. The driving apparatus according to claim 1, wherein
   the driven-part plane forms a depression with respect to a surface of said driven part in a surrounding of the driven-part plane, and
   the fixed-part plane forms a projection, which corresponds to the depression, with respect to a surface of said fixed part in a surrounding of the fixed-part plane.

7. The driving apparatus according to claim 1, wherein
   the driven-part plane forms a projection with respect to a surface of said driven part in a surrounding of the driven-part plane, and the fixed-part plane forms a depression, which corresponds to the projection, with respect to a surface of said fixed part in a surrounding of the fixed-part plane.

8. The driving apparatus according to claim 1, further comprising a driving mechanism for driving said fixed part in a substantially orthogonal direction to the fixed-part plane.

9. A recording/reproducing apparatus comprising:
a fixed part having a fixed-part plane; and
a driven part having a driven-part plane, which faces the fixed-part plane, and driven in a direction substantially parallel to the fixed-part plane,
a liquid lubricant being between the fixed-portion plane and the driven-part plane,
the driven-part plane facing the fixed-part plane such that the driven-part plane is substantially parallel to the fixed-part plane,
said driven part being equipped with a recording medium,
said fixed part being equipped with one or a plurality of recording / reproducing devices,
wherein there is a balance among (i) a surface tension that driven-part plane receives in a direction of crossing the driven-part plane from the lubricant, (ii) a repulsion that the driven-part Plane receives in a direction of crossing the driven-part plane from the lubricant, and (iii) a force that the driven-part plane receives in the direction of crossing the driven-part plane from an element other than the lubricant, and
wherein each of said fixed part and said driven part is formed of a same substrate.

* * * * *